(12) United States Patent
Wang et al.

(10) Patent No.: US 6,852,204 B2
(45) Date of Patent: Feb. 8, 2005

(54) WALL CONSTRUCTION FOR ELECTROLYTIC CELL

(75) Inventors: Weitung Wang, East Amherst, NY (US); Hancun Chen, Williamsville, NY (US); Jack C. Chen, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 172 days.

(21) Appl. No.: 10/208,099

(22) Filed: Jul. 31, 2002

(65) Prior Publication Data

US 2004/0020766 A1 Feb. 5, 2004

(51) Int. Cl.⁷ .............................. C25B 9/00; C25B 11/04
(52) U.S. Cl. ....................... 204/242; 204/260; 204/292; 204/293; 204/291
(58) Field of Search ................................ 204/242, 260, 204/266, 263–265, 279, 291–293, 252

(56) References Cited

U.S. PATENT DOCUMENTS

| | | | | |
|---|---|---|---|---|
| 4,174,260 A | * | 11/1979 | Schmidberger | 204/260 |
| 4,879,916 A | | 11/1989 | Juillerat | 73/865.8 |
| 5,037,525 A | * | 8/1991 | Badwal | 204/421 |
| 5,045,169 A | * | 9/1991 | Feduska et al. | 204/258 |
| 5,205,990 A | * | 4/1993 | Lawless | 422/121 |
| 5,332,483 A | | 7/1994 | Gordon | 204/265 |
| 5,766,317 A | * | 6/1998 | Cable et al. | 96/10 |
| 5,868,918 A | | 2/1999 | Adler et al. | 205/615 |
| 5,871,624 A | | 2/1999 | Crome | 204/286 |
| 6,183,619 B1 | | 2/2001 | Gillman et al. | 205/238 |
| 6,264,820 B1 | * | 7/2001 | Lewin et al. | 205/634 |

OTHER PUBLICATIONS

Murygin, "Steady Polarization of Distributed Gas Electrodes in Cells with Solid Electrolyte. The Method of Effective Coefficients", Translated from Elektrokhimiya, vol. 23, No. 6 pp. 740–747 (1987), (no month).

* cited by examiner

Primary Examiner—Donald R. Valentine
(74) Attorney, Agent, or Firm—David M. Rosenblum

(57) ABSTRACT

A wall construction for an electrolytic cell to separate oxygen from an oxygen containing gas in which an electrolyte layer of less than 200 microns and a cathode layer of less than 500 microns are supported by an anode that can have a sufficient thickness to also contain the separated oxygen at pressure. The cathode is formed from the same material as the electrolyte and also a noble metal or noble metal alloy and a mixed conductor. The cathode contains a sufficient amount of the noble metal or noble metal allow and the mixed conductor that the total resistance thereof is not greater than about 70 percent of the total resistance of the anode and the cathode. In a preferred embodiment, first and second porous interfacial layers are situated between an anode layer and the electrolyte and the electrolyte and a cathode layer, respectively. The first and second porous interfacial layers increase thermal compatibility between the anode and cathode and the electrolyte, improve the three-phase boundary and allow thinner electrolytes to be employed with fewer manufacturing defects.

14 Claims, 1 Drawing Sheet

WALL CONSTRUCTION FOR ELECTROLYTIC CELL

FIELD OF THE INVENTION

The present invention relates to a wall construction for an electrolytic cell to separate oxygen from an oxygen containing gas. More particularly, the present invention relates to such a wall construction in which an electrolyte is located between an anode and a cathode. Still even more particularly the present invention relates to such a wall construction in which the cathode comprises metal, mixed conducting, and ionic conducting components.

BACKGROUND OF THE INVENTION

On-site high purity, high pressure oxygen is required for many industrial applications. Generally, markets for such applications are served by high-pressure gas cylinder or liquid oxygen tanks. Generally, the oxygen is produced by cryogenic separation of air. The separated oxygen is transferred to cylinders which are then shipped to customers.

Solid state oxygen generators have been proposed for on-site production of high-purity oxygen as opposed to the use of cylinder oxygen. In these types of systems electrolytic cells are employed to separate oxygen from air. Each electrolyte cell, whether of flat plate, honeycomb, or tubular configuration, has a wall across which oxygen ions are transported to separate oxygen from the air. Such wall is constructed in layers that comprise electrodes (an anode and a cathode) and an electrolyte, made of an ionic conducting material that is located between the electrodes. Ionic conducting materials include yttria stabilized zirconia, ceria, bismuth oxide, thoria and hafnia, and similar materials known in the ceramics art.

Ionic conducting materials that are used to form the electrolyte will conduct oxygen ions at high temperature. When an electric current is applied to the cathode and the anode, molecular oxygen is ionized at the cathode by gaining electrons. The resultant oxygen ions are then transported through the electrolyte where they emerge from the opposite, anode side to recombine into elemental oxygen by the loss of electrons. The process is typically carried out at a temperature range of between about 600° and about 1000° C. In this temperature range, the electrolytic oxygen separation process can be carried out at close to 100 percent faradic efficiency and with minimum resistive loses.

It is important for the sake of economic efficiency that the cell consumes as little electrical power as possible. In order to fabricate such a cell, the electrolyte should be as thin as possible so that a very small spacing exists between the electrodes. As a result, oxygen ions migrating from one electrode to the other will have a very short distance to travel so that the electrical resistance of the electrolyte is minimized. At the same time, it is preferable that the cathode be as electrically conductive as possible to maximize the number of oxygen ions available per unit area of the electrolyte.

U.S. Pat. No. 4,879,916 discloses an electrolytic cell construction that employs highly conductive electrodes. In this regard, silver and alloys of silver are used to form the electrodes and zirconium or bismuth oxide is used to form the electrolyte. In one embodiment, the electrolyte has a thickness of between about 20 and about 100 microns and the electrodes each have a thickness of about 4 microns and about 30 microns. The thin electrode-electrolyte assembly is supported on a porous alumina tube. Another embodiment does not take advantage of a thin electrolyte, but rather, uses a thick electrolyte of between about 0.5 and about 2.0 mm to support the electrodes.

In U.S. Pat. No. 6,183,619, planar electrochemical cell constructions are illustrated in which one of the electrodes, preferably the anode, serves to support the electrolyte and the other of the electrodes. For instance, an electrolysis cell is illustrated that is specifically designed for steam electrolysis. In this cell, an anode, formed of lanthanum manganite, is about 1 mm thick. Yttria-stabilized zirconia is plasma flame sprayed onto the anode to produce an electrolyte layer having a thickness of 100 microns. A cathode formed of a platinum paste is then printed onto the electrolyte.

As stated above and as illustrated by the foregoing patents, it is known that the cathode should be as electrically conductive as possible. In this regard, silver is a more preferred cathode material due to its high conductivity and comparatively low cost. Noble metals, such as silver, however, have much higher coefficient of expansion than the ceramic materials that are utilized in forming electrolytes. In order to prevent the cathode from separating from the electrolyte at cell operating temperature due to thermal mismatch, as also illustrated in the foregoing patents, the cathode is made as thin as possible.

It has long been recognized in the prior art that at the triple phase boundary between molecular oxygen, oxygen ions and electrons, existing at the junctures of the electrodes and the electrolyte, not only is the least electrical resistance desired, but also, the greatest ionic conduction. Thus, multi-component electrodes have been proposed that can contribute to ionic conduction by containing an ionic conductor. An example of this can be found in Vol. 23, No. 6, Elektrokhimiya, Steady Polarization of Distributed Gas Electrodes In Cells With Solid Electrolyte, pp. 740–747, I. V. Murygin, June 1987. In this reference, electrodes are formed that comprise a metallic conductor, an ionic conductor, and a mixed conductor. Electrodes formed of a multi-component mixture, such as illustrated by the above reference, are inherently more thermally compatible with the electrolyte since they comprise the ionic conducting material of the electrolyte. However, it has been found by the inventors herein that a cathode formed from such a multi-component material must still be very thin so as not to peel away from the electrolyte at operating temperature. Moreover, since the total volume of such a cathode comprises the ionic material, that is not electrically conductive, and a mixed conductor, that is not as electrically conductive as a noble metal such as silver, a cathode formed by such a multi-component material has more resistance than a cathode of the same thickness formed of a noble metal. In fact this resistance can dominate the electrical resistance of the electrolytic cell to cause the cell to consume more power than electrolytic cells formed with cathodes that comprise a single phase of a metallic conductor.

As will be discussed, the present invention provides an electrolytic cell wall construction advantageously employing a multi-component cathode material for thermal compatibility while at the same time limiting the electrical resistance of such a cathode so that it does not dominate the electrical resistance of the cell to thereby prevent the cell from having low power consumption characteristics.

SUMMARY OF THE INVENTION

The present invention provides a wall construction for an electrolytic cell to separate oxygen from an oxygen containing gas. In accordance with the invention, the wall construction comprises a electrolyte layer comprising an ionic conductor located between an anode and a cathode, each of porous configuration and formed by at least an anode layer and a cathode layer, respectively. Current conducting layers overlie the cathode and anode opposite to the electrolyte layer. The electrolyte layer and the cathode layer are not self-supporting and are supported by the anode layer. In this regard, the electrolyte layer and the cathode layer being no greater than about 200 microns thick and about 500 microns thick, respectively. The cathode comprises an electrically conductive noble metal or noble metal alloy, a mixed conductor and the ionic conductor. It is to be noted that the term "mixed conductor" as used herein and in the claims means a material capable of conducting both electrons and ions. The term "ionic conductor" as used herein and in the claims means a material capable of conducting only ions. The anode comprises the mixed conductor. The cathode has sufficient amounts of the electrically conductive noble metal or noble metal alloy and the mixed conductor such that the electrical resistance of the cathode is no more than about 70 percent of the combined resistance of the anode and the cathode.

In the present invention, the three component cathode allows for two different design objectives to be accomplished simultaneously. One design objective is to make the cathode layer thermally compatible with the electrolyte. In this regard, the thermal expansion characteristics between the different layers of the electrolytic cell should be as close as possible to prevent a thermal mismatch. In the present invention, since one of the components is the ionic conductor, the presence of the ionic conductor in the cathode will tend to enhance the thermal match between the cathode and the electrolyte. Since the cathode is thin, non-self-supporting, and has a thickness of no greater than 500 microns, the problem of it dominating the resistance of the cell arises. In the present invention, however, the conductivity of a cathode is increased over cathodes of the prior art by providing sufficient amounts of noble metal or noble metal alloy and mixed conductor that the resistance of the cathode can be made no more than 70 percent of the combined resistance of the cathode and anode.

Since the electrolytic cell of the present invention is anode supported, the anode is inherently much thicker than either the electrolyte or the cathode and therefore, sufficiently electrically conductive without a high proportion of expensive noble metals and noble metal alloys. With respect to the cathode, since part of the required electrical conductivity is provided by the mixed conductor, there again is a savings in the amount of noble metals and noble metal alloys that otherwise would be required. Thus, an electrolytic cell incorporating a wall construction of the present invention can be more economically fabricated than cells of the prior art.

A wall construction in accordance with the present invention can be a three layer structure and as such, the anode can be solely formed by the anode layer and the cathode can be solely formed by the cathode layer. In such an embodiment, the anode layer can comprise between about 0 percent and about 20 percent by volume of the electrically conductive noble metal or noble metal alloy, between about 0 percent and about 60 percent by volume of the ionic conductor, and between about 20 percent and about 100 percent by volume of the mixed conductor. The cathode layer can comprise between about 5 percent and about 50 percent by volume of the electrically conductive noble metal or noble metal alloy. Additionally, the ionic conductor can be present in an amount of between about 5 percent and about 45 percent by volume and the mixed conductor can be present in an amount from between about 5 percent and about 90 percent by volume.

More preferably, the anode layer comprises between 0 percent and about 5 percent by volume of the electrically conductive noble metal or noble metal alloy, between about 40 percent and about 50 percent of the ionic conductor, and between about 45 percent and about 60 percent of the mixed conductor. The cathode can comprise between about 25 percent by volume and about 35 percent by volume of the electrically conductive noble metal or noble metal alloy, between about 20 percent and about 30 percent by volume of the ionic conductor, and between about 35 percent and about 55 percent by volume of the mixed conductor.

Preferably, the electrolyte layer has an electrolyte layer thickness range of between about 20 microns and about 50 microns. Additionally, the anode layer has an anode layer thickness range of between about 1.0 mm and 2.0 mm and the cathode has a cathode layer thickness range of between about 50 microns and about 100 microns. In such a wall construction, the anode layer and the cathode layer each have a porosity range of between about 20 percent and about 30 percent. The anode layer has an anode layer pore size range of between about 5 and about 10 microns and the cathode layer has a cathode pore size range of between about 0.2 and about 5 microns.

A particularly preferred wall construction of the present invention utilizes an anode layer consisting essentially of about 50 percent by volume of ceria and about 50 percent by volume of strontium and cobalt doped lanthanum iron oxide. The cathode layer comprises about 20 percent by volume of silver, about 30 percent by volume of ceria, and about 50 percent by volume of strontium and cobalt doped lanthanum iron oxide. The electrolyte comprises ceria. The electrolyte layer can have an electrolyte layer thickness of about 70 microns, the anode layer can have an anode layer thickness of about 1.0 mm, and the cathode can have a cathode layer thickness of about 50 microns. Preferably, the anode layer and the cathode layer each have a porosity of about 30 percent. In this regard, the anode layer has an anode layer pore size of between about 5 and about 10 microns and the cathode layer has a cathode pore size of between about 0.2 and about 0.3 microns. It is to be noted that the term "porosity" as used herein and in the claims means a porosity measured by mercury porosimetry. The term "pore size" as used herein and in the claims means average pore size.

In another aspect of the present invention, the anode and cathode can also be formed by first and second porous interfacial layers located between the anode layer and the electrolyte layer and the electrolyte layer and the cathode, respectively. These interfacial layers can add another gradation in the amount of ionic conducting material to help enhance thermal compatibility. Additionally, the presence of pores in these layers provide an enhanced surface area for reduction of the molecular oxygen to oxygen ions and the reconstitution of the oxygen ions into oxygen molecules. Moreover, a pore gradient can be used so that the pores of the first and second porous interfacial layers are smaller than those of the anode and cathode layers. This is particularly important at the anode in that small pores presented by the first interfacial layer allow for very thin electrolyte layers to be applied without defects such as holes. In case of a pore gradient, the first and second porous interfacial layers have a porosity greater than that of the cathode and anode layers.

In a wall construction in accordance with the foregoing aspect of the present invention, the anode layer can comprise from between about 0 percent and about 20 percent by volume of the electrically conductive noble metal or noble metal alloy, between about 0 percent and about 60 percent by volume of the ionic conductor and between about 20 percent and about 100 percent by volume of the mixed conductor. The cathode layer can comprise between about 0 percent and about 95 percent by volume of the electrically conductive noble metal or noble metal alloy. Also the cathode layer comprises between about 0 percent and about 5 percent by volume of the ionic conductor and between about 0 percent and about 100 percent by volume of the mixed conductor. The first porous interfacial layer comprises between about 0 percent and about 20 percent by volume of the electrically conductive noble metal or noble metal alloy, between about 5 percent and about 75 percent by volume of the ionic conductor and between about 5 percent and about 95 percent by volume of the mixed conductor. The second porous interfacial layer comprises between about 0 percent and about 5 percent by volume of the electrically conductive noble metal or noble metal alloy, between about 5 percent and about 95 percent by volume of the ionic conductor and between about 0 percent and about 95 percent by volume of the mixed conductor.

More preferably, the anode layer can comprise about 0 percent and about 5 percent by volume of the electrically conductive noble metal or noble metal alloy, between about 40 percent and about 50 percent by volume of the ionic conductor, and between about 45 percent and about 60 percent by volume of the mixed conductor. The cathode layer comprises between about 45 percent and about 55 percent by volume of the electrically conductive noble metal or noble metal alloy, between about 0 percent and about 5 percent by volume of the ionic conductor, and between about 40 percent and about 55 percent by volume of the mixed conductor. The first porous interfacial layer comprises between about 0 percent and about 5 percent by volume of the electrically conductive noble metal or noble metal alloy, between about 50 percent and about 75 percent by volume of the ionic conductor, and between about 20 percent and about 50 percent by volume of the mixed conductor. The second porous interfacial layer comprises between about 0 percent and about 5 percent by volume of the electrically conductive noble metal or noble metal alloy, between about 45 percent and about 55 percent by volume of the ionic conductor, and between about 40 percent and about 55 percent by volume of the mixed conductor.

In an embodiment of a wall construction, having material concentrations discussed above, the electrolyte layer thickness is between about 20 microns and about 50 microns, the anode layer thickness is between about 1.0 mm and about 2.0 mm, and the cathode thickness is between about 50 microns and about 100 microns. The anode layer and the cathode layer each have a porosity of between about 20 percent and about 30 percent. In this regard, anode layer has an anode layer pore size range of between about 5 and about 15 microns and the cathode layer has a cathode pore size range of between about 0.2 and about 10 microns. Each of the first and second porous interfacial layers has a porosity of between about 40 percent and about 60 percent. The first porous interfacial layer has a first porous interfacial layer pore size range of between about 0.1 and about 7 microns and the second porous interfacial layer has a second porous interfacial layer pore size of between about 0.1 and about 5 microns.

In an embodiment of the present invention that exhibits particularly low resistance, the anode layer comprises about 50 percent by volume of ceria and about 50 percent by volume of strontium and cobalt doped lanthanum iron oxide. The cathode comprises about 30 percent by volume of silver, and about 70 percent by volume of strontium and cobalt doped lanthanum iron oxide and the electrolyte comprises ceria. The electrolyte layer has an electrolyte layer thickness of about 20 microns, the anode layer has an anode layer thickness of about 1.0 mm, and the cathode has a cathode layer thickness of about 25 microns. The anode layer in such embodiment has a porosity of about 25 percent, and the cathode layer has a porosity of about 30 percent. In this regard, the anode layer has an anode layer pore size of between about 5 and about 10 microns and the cathode layer has a cathode pore size of between about 0.2 and about 0.3 microns.

In the foregoing embodiment, the first interfacial layer has a first interfacial layer thickness of about 20 microns, a first pore size of between about 1 microns and about 2 microns, and a first porosity of between about 20 percent and about 35 percent. The second interfacial layer has a second interfacial layer thickness of about 25 microns, a second pore size of between about 0.1 microns and about 0.2 microns, and a porosity of between about 35 percent and about 40 percent.

In any embodiment of the present invention, the electrically conductive noble metal or noble metal alloy is silver. The ionic conductor can be zirconia, yttria stabilized zirconia, ceria, gadolinium doped ceria or strontium dope ceria. The ionic conductor can more generally be said to be a ceria based material and the mixed conductor can be strontium and cobalt doped lanthanum iron oxide.

BRIEF DESCRIPTION OF THE DRAWINGS

While the specification concludes with claims distinctly pointing out the subject matter than applicants regard as their invention, it is believed that the invention will be better understood when taken in connection with the accompanying drawings in which:

In order to avoid needless repetition in the explanation of the elements of the figures, the same element numbers were used in the figures for elements having the same general description.

DETAILED DESCRIPTION

Figure 1:
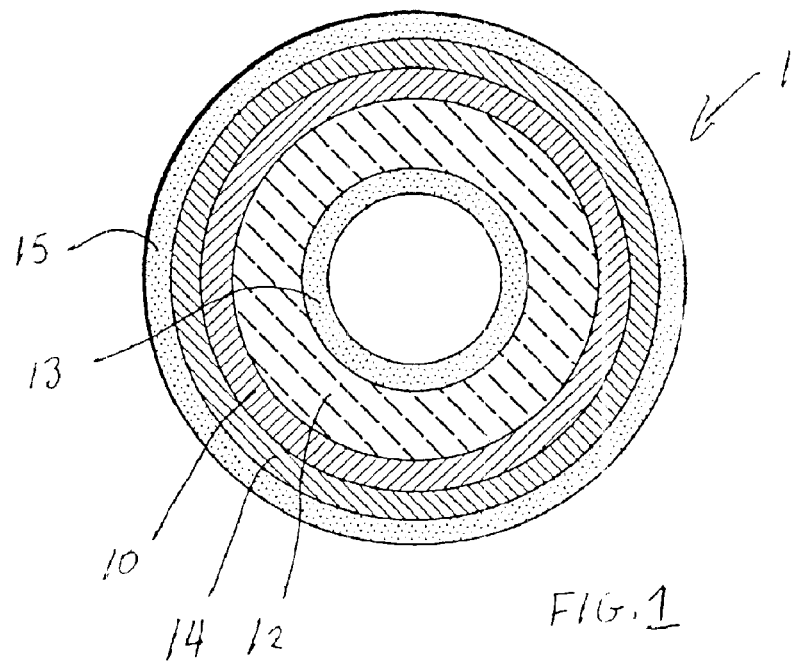
FIG. 1 is a schematic illustration of a wall construction in accordance with the present invention.

With reference to FIG. 1, a wall construction 1 in accordance with the present invention is illustrated. As can be appreciated, wall construction 1 could be a wall of a flat planar type electrolytic cell or a cylindrical element of an electrolytic cell or a honeycomb structure.

Wall construction 1 has an electrolyte layer 10 located between an anode layer 12 and a cathode layer 14. Current conducting layers 13 and 15 overlie the cathode layer 14 and anode layer 12, respectively, opposite to electrolyte layer 10. Preferably current conducting layers 13 and 15 are formed of silver. As will be discussed, anode layer 12 and cathode layer 14 in wall construction 1 consists of two layers sandwiching electrolyte layer 10. However, it is possible for the anode and cathode of a wall construction of the present invention to be formed of multiple layers.

Wall construction 1 is particularly applicable to anode supported structures in which anode layer 12 is thick enough so that when it serves as a sidewall of a tubular element. Oxygen produced under pressure may be contained within such cylindrical element. At the same time, electrolyte layer 10 and cathode layer 14 are not self-supporting and exist as thin layers supported by anode layer 12.

The anode layer 12 is designed for high strength and highly conductive operation. It preferably has a porosity of more than about a 20 percent. Preferably anode layer 12 is at least about 1.0 mm thick to contain the separated oxygen under pressure. In accordance with the present invention, this is accomplished by an anode formed of at least a mixed conductor. A multicomponent structure is possible. As mentioned above, a good thermal expansion match is needed between anode layer 12 and electrolyte layer 10. In order for an electrolytic cell utilizing wall construction 1 to have low power requirements, the resistance of electrolyte layer 10 must be as low as possible. In order for this to occur, in ceria based electrolytes, for instance, gadolinium or sumarium doped ceria, and scandia doped zirconia, electrolyte layer 10 should have a thickness of no greater than about 40 microns. When yttria doped zirconia is used, the electrolyte layer 10 should not exceed about 10 microns.

Cathode layer 14 is deposited on top of electrolyte layer 10. As stated above, in order to achieve a very low resistance while maintaining thermal compatibility with the electrolyte, a composite of a noble metal, preferably silver or an alloy of silver, the ionic conductor, and a mixed conductor is present. The cathode layer 14 can also be infiltrated with a catalyst material such as cobalt. Preferably, sufficient amounts of the noble metal or alloys of noble metal and mixed conductor are present that the cathode layer 14 contributes no more than 70 percent of the total resistance of cathode layer 14 and anode 12.

Wall construction 1 can be fabricated by first forming anode layer 12 by isopressing and then applying a dense electrolyte layer 10 by slurry coating or thermal spraying techniques. After co-firing the resultant structure, cathode layer 14 is deposited upon electrolyte layer 10 by means of a slurry coating.

The following Table 1 sets forth examples of architectures for wall construction 1.

TABLE 1

| | Wall Construction 1 | | |
|---|---|---|---|
| element (range #) | Cathode Layer 14 | Electrolyte Layer 10 | Anode layer 12 |
| Thickness (I) | 10–500 $\mu$m | 10–200 $\mu$m | 0.5–5 mm |
| Thickness (II) | 50–100 $\mu$m | 20–50 $\mu$m | 1–2 mm |
| Pore Size (I) | 0.2–15 $\mu$m | <1 $\mu$m | 30–50 $\mu$m |
| Pore Size (II) | 0.2–5 $\mu$m | <0.1 $\mu$m | 5–10 $\mu$m |
| Porosity (I) | 15–50% | <10% | 15–50% |
| Porosity (II) | 20–30% | <3% | 20–30% |
| Noble Metal or Alloy content (I) | 5–50% | 0% | 0–20% |
| Ionic Conductor content (I) | 5–45% | >90% | 0–60% |
| Mixed Conductor content (I) | 5–90% | <10% | 20–100 |
| Noble Metal or Alloy content (II) | 25–35% | 0% | 0–5% |
| Ionic Conductor content (II) | 20–30% | >98% | 40–50% |
| Mixed Conductor Content (II) | 35–55% | <2% | 45–60% |

Although not specifically set forth in Table I, impurities may exist in the resultant wall construction 1 either from the material source itself or arising during manufacturing. Another point worth mentioning is that although anode layer 12 can be made solely from a mixed conductor, it preferably at least also contains the ionic conductor (Range II).

Range II is more preferred over Range I in that cathode layer 14 will be inherently more electrically conductive since it uses more noble metal than Range I. In this regard, the material concentration ranges alone allow for a wall construction to be made in which the cathode will not totally dominate the electrical resistance of the electrodes.

Wall constructions utilizing the thickness ranges given above have several advantages. With respect to cathode layer 14, thinner cathodes are more durable from a thermal compatibility standpoint. At to electrolyte layer 10, thinner electrolytes, as mentioned above, are necessary for low cell resistance. Although thinner anodes allow for more efficient material utilization, the ranges set forth in Range II represent a compromise to allow the anode layer 12 to contain the oxygen at elevated pressures. For these aforementioned reasons, the thickness given for each element in Range II are preferred over Range I.

Pore size and porosity given in Range II are preferred over Range I in that on the anode side more oxygen is allowed to diffuse and on the cathode side, sites are increased for oxygen reduction. It is to be noted that smaller pore sizes at the electrolyte are particularly preferred for ease of forming a thin electrolyte layer 10 on anode layer 12 with few pinhole-type defects. In this regard the more pores in the electrolyte, the less pure the oxygen product. As such, a porosity in electrolyte layer 10 of less than 3 percent is preferred with a pore size of less than 0.1 microns. Furthermore, although some degree of conductivity can be tolerated in electrolyte layer 10, this is not preferred for obvious reasons and the mixed conductor content is preferably kept below 2 percent.

Wall construction 1 was incorporated into a tubular structure in which an anode layer 12 was formed of a mixture of about 50 percent by volume of gadolinium doped ceria ("CGO") and about 50 percent by volume of strontium and cobalt doped lanthanum iron oxide ("LSCF"). The LSCF had a chemical formula of $La_{0.6}Sr_{0.4}Co_{0.2}Fe_{0.8}O_3$. Electrolyte layer 10 was made of CGO. A cathode layer 14 was formed having about 20 percent by volume of silver, about 30 percent by volume of CGO, and about 50 percent by volume of LSCF. Anode layer 12 had a thickness of about 1.0 mm, a porosity of about 30 percent, and a pore size of between about 5 microns and about 10 microns. Electrolyte layer 10 was about 70 microns thick. Cathode layer 14 had a thickness of about 50 microns, a porosity of about 30 percent, a pore size of between about 0.2 and about 0.3 microns. Current connectors 13 and 15, formed of silver were each about 50 to 100 microns thick.

Wall construction 1 can be formed by first forming anode layer 12. In the formation of anode layer 12, a mixture is produced that contains: 1) forty-six grams of LSCF powder having particle sizes less than 30 $\mu$m; 2) fifty-four grams of CGO powder having particle sizes less than 30 $\mu$m; and 3) seventeen and a half grams of graphite pore former having particle sizes less than 74 $\mu$m. The mixture was placed into a plastic vial with a few methacrylate mixing malls. The vial was then inserted into a SPEX CERTIPREP Mixer/Mill and mixed for 10 minutes. A polyurethane bag was placed over a mandrel, 9.5 mm in diameter, and the prepared mixture was slowly poured into the bag to the desired volume as the bag and mandrel were vibrated. The bag was then capped and iso-statically pressed at 20 kpsi for 2 minutes. After iso-pressing, the bag was removed and the mandrel was withdrawn leaving a green tube.

The iso-pressed green tube was then loaded into a furnace and heated 1° C. per minute under ambient air to 700° C. for 2 hours to remove the graphite pore former. The heating ramp was then increased to 2° C. per minute to 1300° C. for 4 hours. The furnace was cooled to room temperature at the rate of 2° C. per minute. The tube was removed from the furnace as anode layer 10. Anode layer 10 had a wall thickness of about 1 mm.

Electrolyte layer 10 was then formed by plasma spraying anode layer 10 with gadolinium doped ceria to a thickness of about 70 microns using standard deposition conditions.

Cathode layer 14 when applied to electrolyte layer 10 by dipping the composite tube into a slurry solution containing about 20% silver, about 30% CGO, and about 50% LSCF with an average particle size of 0.6 $\mu$m. Cathode layer 14 had a thickness of about 50 $\mu$m. The coated composite tube was fired at 900° C. for 2 hrs and cooled to room temperature at the rate of 2° C. per minute.

When composite tube of wall construction 1 was tested at an operating temperature of about 750° C., it was found to have an average specific resistance of about 0.7 ohm cm$^2$.

Figure 2:
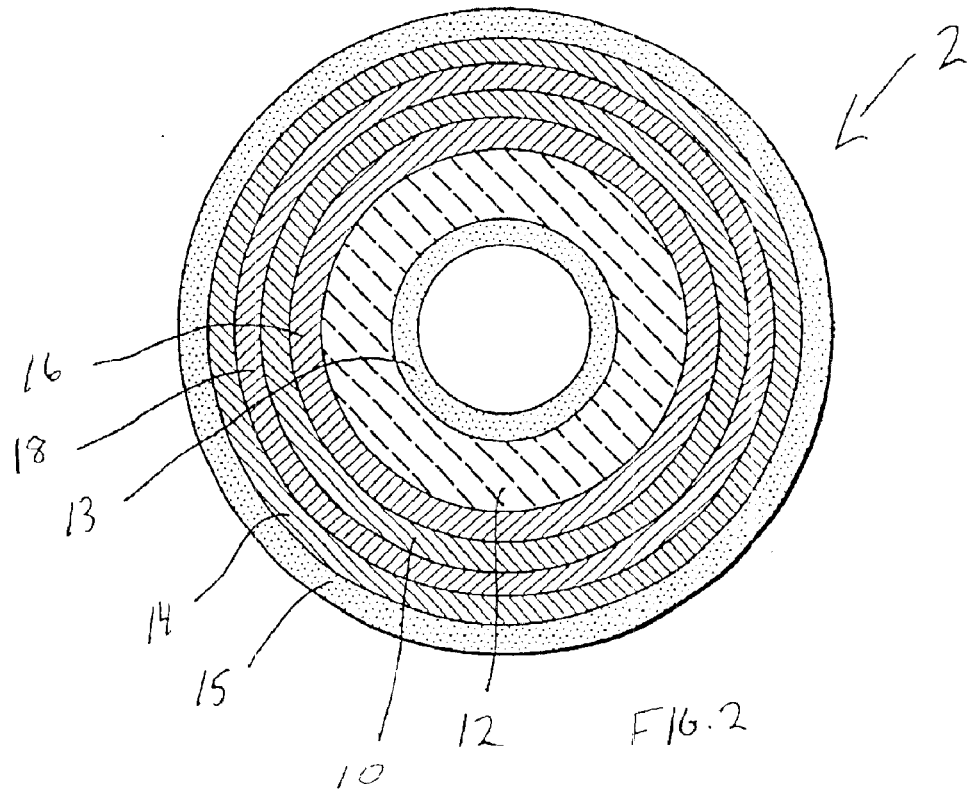
FIG. 2 is a schematic illustration of an alternative embodiment of a wall construction in accordance with the present invention.

With reference to FIG. 2, a wall construction 2 of the present invention is illustrated. As indicated a first porous interfacial layer 16 is located between anode layer 12 and electrolyte layer 10. A second porous interfacial layer 18 is located between electrolyte layer 10 and cathode layer 14. In this embodiment, first porous interfacial layer 16 and anode layer 12 form the anode and second porous interfacial layer 18 and cathode layer 14 form the cathode. In such an embodiment the noble metal or noble metal alloy need only be present in cathode layer 12 or interfacial layer 16. It can be present in both such layers.

Wall construction 2 improves the microstructure of the electrodes, anode 12 and cathode 14 by optimizing the conductivity and size distribution between particles of each solid phase to yield a larger three-phase boundary for oxygen reduction or recombination. Furthermore, first and second interracial layers 16 and 18 can also help to provide a more gradual transition between electrolyte layer 10 and anode layer 14 and cathode layer 12 for thermal expansion purposes.

The following Table 2 is a chart of examples of architectures for cell wall construction 2.

Wall construction 2 was incorporated into a tubular structure in which an anode 12 layer was formed of a mixture of about 50 percent by volume of CGO and about 50 percent by volume of LSCF. The LSCF had a chemical formula of $La_{0.6}Sr_{0.4}Co_{0.2}Fe_{0.8}O_3$. First interfacial layer 16 had the same composition as anode layer 12. Electrolyte layer 10 consisted of CGO. A cathode layer 14 was formed having about 30 percent by volume of silver and about 70 percent by volume of LSCF. Second Interfacial layer 18 had about 60 percent by volume of LSCF and 40 percent by volume of CGO. Thus, the cathode of this embodiment contains noble metal and mixed conducting material in the cathode layer 14 and mixed conducting material and ionic conducting material in the second interfacial layer 18 such that overall, the cathode contains noble metal, mixed conducting material, and ionic conducting material.

Anode layer 12 had a thickness of about 1.0 mm, a porosity of about 25 percent and pores ranging in size from about 5 microns to about 10 microns. First interfacial layer 16 had a thickness of about 20 microns, a porosity of between about 30 percent and about 35 percent. Electrolyte layer 10 was about 20 microns thick. Cathode layer 14 and second interfacial layer 18 each had a thickness of about 25 microns. Cathode layer 14 had a porosity of about 30 percent and pore sizes of between about 0.2 microns and about 0.3 microns. Second interfacial layer 18 had a porosity of between about 35 percent and about 40 percent and pore sizes of between about 0.1 microns and about 0.2 microns. Current connectors 13 and 15, were formed of silver and were each anywhere from between about 50 and about 100 microns thick.

Wall construction 2 is formed by first forming an anode layer 12 by isopressing a green tube in the same manner as in wall construction 1. The green tube was loaded into a furnace and heated 1° C. per minute under ambient air to 700° C. for 2 hours to remove the graphite pore former. The heating ramp was then increased to 2° C. per minute to 950° C. for 4 hours. The furnace was cooled to room temperature at the rate of 2° C. per minute.

The first porous interfacial layer 16 was then formed by dipping the tube into a first slurry solution containing about

TABLE 2

| | Wall construction 2 | | | | |
|---|---|---|---|---|---|
| element (range #) | Cathode Layer 14 | Second Interfacial Layer 18 | Anode Layer 12 | Electrolyte Layer 10 | First Interfacial Layer 16 |
| Thickness (I) | 10–500 $\mu$m | 15–70 $\mu$m | 0.5–5 mm | 10–200 $\mu$m | 15–70 $\mu$m |
| Thickness (II) | 50–100 $\mu$m | 20–40 $\mu$m | 1–2 mm | 20–50 $\mu$m | 20–40 $\mu$m |
| Pore Size (I) | 0.2–20 $\mu$m | 0.1–15 $\mu$m | 5–30 $\mu$m | <1 $\mu$m | 0.1–20 $\mu$m |
| Pore Size (II) | 0.2–10 $\mu$m | 0.1–5 $\mu$m | 5–15 $\mu$m | <0.1 $\mu$m | .1–7 $\mu$m |
| Porosity (I) | 15–50% | 20–90% | 15–50% | <10% | 20–90% |
| Porosity (II) | 20–30% | 40–60% | 20–30% | <3% | 40–60% |
| Metal content (I) | 0–95% | 0–5% | 0–20% | 0% | 0–20% |
| Ionic Conductor content (I) | 0–5% | 5–95% | 0–60% | >90% | 5–75% |
| Mixed Conductor content (I) | 0–100% | 0–95% | 20–100% | <10% | 5–95% |
| Metal content (II) | 45–55% | 0–5% | 0–5% | 0% | 0–5% |
| Ionic Conductor content (II) | 0–5% | 45–55% | 40–50% | >98% | 50–75% |
| Mixed Conductor content (II) | 40–55% | 40–55% | 45–60% | <2% | 20–50% |

The same distinctions that were drawn for the "range I" and "range II" elements of Table 1 apply equally to Table 2.

50% by weight of CGO and about 50% by weight of LSCF with an average particle size of 1.2 $\mu$m. First interfacial layer was so formed with a thickness of about 20 $\mu$m. Once the coating was dry, the composite tube was heated at 1° C. per minute in ambient air to 700° C. for 2 hours. The furnace was cooled to room temperature at a rate of 2° C. per minute.

Electrolyte layer 10 was then formed by dipping the resulting composite tube into a second slurry solution containing CGO with an average particle size of 0.5 µm. The resultant electrolyte layer 10 had a thickness of about 20 µm. The coated tube was then loaded back into the furnace and heated at between about 1 and about 2° C. per minute under ambient air to 1335° C. for 4 hours. The furnace was cooled to room temperature at the rate of 2° C. per minute. Second interfacial layer 18 was then formed by dipping the sintered composite tube into a third slurry solution containing about 60% by weight of LSCF and 40% by weight of CGO with an average particle size of 0.4 µm. Second interfacial layer 18 was found to have a thickness of about 25 µm. Once the coating was dry, the cathode layer 14 was formed by dipping the composite tube into a forth slurry solution containing about 30% by weight silver and about 70% by weight LSCF with an average particle size of 0.6 µm. Cathode layer 14 had a thickness of about 25 µm. The coated composite tube was finally fired at 900° C. for 2 hrs and cooled to room temperature at the rate of 2° C. per minute. When the wall construction 2 was tested at an operating temperature of about 750° C., it was found to have an average specific resistance of about 0.3 ohm cm$^2$.

Although the present invention has been described with reference to preferred embodiments, as will occur to those skilled in the art, numerous changes, additions and omissions may be made without departing from the spirit and scope of the present invention.

We claim:

1. A wall construction for an electrolytic cell to separate oxygen from an oxygen comprising gas, said wall construction comprising:

an electrolyte layer formed of an ionic conductor;

the electrolyte layer located between an anode and cathode each of porous configuration and formed by at least an anode layer and a cathode layer, respectively;

current conducting layers overlying the cathode and anode opposite to the electrolyte layer;

said electrolyte layer and said cathode layer being no greater than about 200 microns thick and about 500 microns thick, respectively, said anode layer supporting said electrolyte layer and said cathode layer;

said cathode comprising an electrically conductive noble metal or noble metal alloy, a mixed conductor, and said ionic conductor;

said anode comprising said mixed conductor; and said cathode having sufficient amounts of said electrically conductive noble metal or noble metal alloy and said mixed conductor such that the electrical resistance of said cathode is no more than about 70 percent of combined resistance of said anode and cathode.

2. The wall construction of claim 1, wherein:

said anode is solely formed by said anode layer and said cathode is solely formed by said cathode layer;

said anode layer comprises between about 0 percent and about 20 percent by volume of said electrically conductive noble metal or noble metal alloy, between about 0 percent and about 60 percent by volume of said ionic conductor and no less than about 20 percent by volume of said mixed conductor; and said cathode layer comprises between about 5 percent and about 50 percent by volume of said electrically conductive noble metal or noble metal alloy, between about 5 percent and about 45 percent by volume of said ionic conductor and between about 5 percent and about 90 percent by volume of said mixed conductor.

3. The wall construction of claim 1, wherein:

said anode is solely formed by said anode layer and said cathode is solely formed by said cathode layer;

said anode layer comprises between about 0 percent and about 5 percent of said electrically conductive noble metal or noble metal alloy, between about 40 percent and about 50 percent of said ionic conductor, and about and between about 45 percent and about 60 percent of said mixed conductor; and said cathode comprises between about 25 percent and about 35 percent of said electrically conductive noble metal or noble metal alloy, between about 20 percent and about 30 percent of said ionic conductor, and about and between about 35 percent and about 55 percent of said mixed conductor.

4. The wall construction of claim 3, wherein:

said electrolyte layer has an electrolyte layer thickness of between about 20 microns and about 50 microns;

said anode layer has an anode layer thickness of between about 1.0 mm and 2.0 mm;

said cathode has a cathode layer thickness of between about 50 microns and about 100 microns;

said anode layer and said cathode layer each have a porosity range of between about 20 percent and about 30 percent;

said anode layer has an anode layer pore size in a range of between about 5 and about 10 microns; and said cathode layer has a cathode pore size range of between about 0.2 and about 5 microns.

5. The wall construction of claim 1, wherein:

said anode is solely formed by said anode layer and said cathode is solely formed by said cathode layer;

said anode layer comprises about 50 percent by volume of ceria and about 50 percent by volume of strontium and cobalt doped lanthanum iron oxide; and said cathode comprises about 20 percent by volume of silver, about 30 percent by volume of ceria, and about 50 percent by volume of strontium and cobalt doped lanthanum iron oxide;

said electrolyte comprises ceria;

said electrolyte layer has an electrolyte layer thickness of about 70 microns;

said anode layer has an anode layer thickness of about 1 mm;

said cathode has a cathode layer thickness of about 50 microns;

said anode layer and said cathode layer each have a porosity of about 30 percent;

said anode layer has an anode layer pore size of between about 5 and about 10 microns; and said cathode layer has a cathode pore size of between about 0.2 and about 0.3 microns.

6. The wall construction of claim 1, wherein:

said anode and cathode are also formed by first and second porous interfacial layers located between said anode layer and said electrolyte layer and said electrolyte layer and said cathode, respectively; and said first and second porous interfacial layers each comprise said ionic conductor and said mixed conductor.

7. The wall construction of claim 6, wherein said second porous interfacial layer has a pore size lower than that of said cathode layer and a porosity greater than that of said cathode layer.

8. The wall construction of claim 7, wherein:

said anode layer comprises between about 0 percent and about 20 percent by volume of said electrically conductive noble metal or noble metal alloy, between about 0 percent and about 60 percent by volume of said ionic conductor and between about 20 percent and about 100 percent by volume of said mixed conductor;

said cathode layer comprises between about 0 percent and about 95 percent by volume of said electrically conductive noble metal or noble metal alloy, between about 0 percent and about 5 percent by volume of said ionic conductor and between about 0 percent and about 100 percent by volume of said mixed conductor;

said first porous interfacial layer comprises between about 0 percent and about 20 percent by volume of said electrically conductive noble metal or noble metal alloy, between about 5 percent and about 75 percent by volume of said ionic conductor and between about 5 percent and about 95 percent by volume of said mixed conductor; and said second porous interfacial layer comprises between about 0 percent and about 5 percent by volume of said electrically conductive noble metal or noble metal alloy, between about 5 percent and about 95 percent by volume of said ionic conductor and between about 0 percent and about 95 percent by volume of said mixed conductor.

9. The wall construction of claim 7, wherein:

said anode layer comprises between about 0 percent and about 5 percent by volume of said electrically conductive noble metal or noble metal alloy, between about 40 percent and about 50 percent by volume of said ionic conductor and between about 45 percent and about 60 percent by volume of said mixed conductor;

said cathode layer comprises between about 45 percent and about 55 percent by volume of said electrically conductive noble metal or noble metal alloy, between about 0 percent and about 5 percent by volume of said ionic conductor and between about 40 percent and about 55 percent by volume of said mixed conductor;

said first porous interfacial layer comprises between about 0 percent and about 5 percent by volume of said electrically conductive noble metal or noble metal alloy, between about 50 percent and about 75 percent by volume of said ionic conductor and between about 20 percent and about 50 percent by volume of said mixed conductor; and said second porous interfacial layer comprises between about 0 percent and about 5 percent by volume of said electrically conductive noble metal or noble metal alloy, between about 45 percent and about 55 percent by volume of said ionic conductor and between about 40 percent and about 55 percent by volume of said mixed conductor.

10. The wall construction of claim 9, wherein:

said electrolyte layer thickness is between about 20 microns and about 50 microns;

said anode layer thickness is between about 1 mm and about 2 mm;

said cathode thickness is between about 50 microns and about 100 microns;

said anode layer and said cathode layer each have a porosity of between about 20 percent and about 30 percent;

said anode layer has an anode layer pore size of between about 5 and about 15 microns; and said cathode layer has a cathode pore size of between about 0.2 and about 10 microns;

each of said first and second porous interfacial layers has a porosity of between about 40 percent and about 60 percent;

said first porous interfacial layer has a first porous interfacial layer pore size of between about 0.1 and about 7 microns; and said second porous interfacial layer has a second porous interfacial layer pore size of between about 0.1 and about 5 microns.

11. The wall construction of claim 7, wherein:

said anode layer comprises about 50 percent by volume of ceria and about 50 percent by volume of strontium and cobalt doped lanthanum iron oxide; and said cathode comprises about 30 percent by volume of silver, and about 70 percent by volume of strontium and cobalt doped lanthanum iron oxide;

said electrolyte comprises ceria;

said electrolyte layer has an electrolyte layer thickness of about 20 microns;

said anode layer has an anode layer thickness of about 1 mm;

said cathode has a cathode layer thickness of about 25 microns;

said anode layer has a porosity of about 25 percent;

said cathode layer has a porosity of about 30 percent;

said anode layer has an anode layer pore size of between about 5 and about 10 microns;

said cathode layer has a cathode pore size of between about 0.2 and about 0.3 microns;

said first interfacial layer has a first interfacial layer thickness of about 20 microns, a first pore size of between about 1 microns and about 2 microns, and a first porosity of between about 20 percent and about 35 percent; and said second interfacial layer has a second interfacial layer thickness of about 25 microns, a second pore size of between about 0.1 microns and about 0.2 microns, and a porosity of between about 35 percent and about 40.

12. The wall construction of claim 1 or claim 5 or claim 6 or claim 11, wherein said electrically conductive noble metal or noble metal alloy is silver.

13. The wall construction of claim 1 or claim 5 or claim 6 or claim 11, wherein said ionic conductor is zirconia, yttrium stabilized zirconia, ceria, gadolinium doped ceria or strontium doped ceria.

14. The wall construction of claim 1 or claim 5 or claim 6 or claim 11, wherein said ionic conductor is a ceria based material and said mixed conductor is $La_{0.6}Sr_{0.4}Co_{0.2}Fe_{0.8}O_3$.

* * * * *